(12) United States Patent
Gamble et al.

(10) Patent No.: US 6,385,260 B1
(45) Date of Patent: May 7, 2002

(54) ASYNCHRONOUS SAMPLING DIGITAL DETECTION (ASDD) METHODS AND APPARATUS

(75) Inventors: Charles B. Gamble; Uri Rogers, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/161,049

(22) Filed: Sep. 25, 1998

(51) Int. Cl.[7] .......................... H03D 1/04; H03D 1/06; H03K 5/01; H03K 6/04; H04B 1/10; H04L 1/00; H04L 25/08
(52) U.S. Cl. ...................................... 375/346
(58) Field of Search ............................ 375/224, 227, 375/254, 285, 316, 340, 343, 346, 348, 350; 704/226

(56) References Cited

U.S. PATENT DOCUMENTS

| | | | |
|---|---|---|---|
| 5,293,369 A | 3/1994 | Melas et al. | 369/59 |
| 5,295,128 A | 3/1994 | Hutchins et al. | 369/59 |
| 5,315,284 A | 5/1994 | Bentley | 340/146.2 |
| 5,442,315 A | 8/1995 | Hutchins | 327/159 |
| 5,461,638 A | 10/1995 | Hutchins et al. | 375/354 |
| 5,461,642 A | 10/1995 | Hutchins et al. | 375/327 |
| 5,502,711 A | 3/1996 | Clark et al. | 369/124 |
| 5,530,601 A | 6/1996 | Hutchins et al. | 360/46 |
| 5,629,914 A | 5/1997 | Clark et al. | 369/59 |
| 6,001,131 A | * 12/1999 | Raman | 703/226 |

* cited by examiner

Primary Examiner—Jean B Corrielus

(57) ABSTRACT

Asynchronous sampling digital detection (ASDD) methods and apparatus are described. In one embodiment, noise-corrupted information is received and comprises a plurality of information-carrying events which encode binary information which is desired to be retrieved. A plurality of values are extracted from the noise-corrupted information-carrying events which are representative of the encoded binary information. An amount of noise corruption carried by one of these plurality of values is estimated by considering an amount of noise corruption carried by another of the plurality of values. Responsive to the estimation of the noise corruption, the one value is then modified. In another embodiment, noise-corrupted information is received comprising a plurality of information-carrying events which encode binary information which is desired to be retrieved. A plurality of values from the noise-corrupted information-carrying events are determined which are representative of the encoded binary information. A set of conditions is defined which are a function of the plurality of values, and which have value-dependent outcomes. For a given determined value of the plurality of values, a value-dependent outcome is imposed to produce at least two intermediate noise-adjusted values. Using the two intermediate noise-adjusted values, a noise-reduced output value for the given determined value is selected.

20 Claims, 6 Drawing Sheets

| Z | 2.20 | 1.60 | 3.40 | 4.20 | 1.80 | 3.20 |
|---|---|---|---|---|---|---|
| R=ROUND | 2 | 2 | 3 | 4 | 2 | 3 |
| E=Z−R | 0.2 | −0.4 | 0.4 | 0.2 | −0.2 | 0.2 |
| | | | | | | |
| FILTER 1 | 0.0 | 0.5 | 0.6 | 0.0 | 0.5 | 0.6 |
| M | 2 | 2 | 3 | 4 | 2 | 3 |
| Xm=Z+FILTER 1*E(n−1) | 2.20 | 1.70 | 3.16 | 4.20 | 1.90 | 3.08 |
| Em=abs(M−Xm) | 0.20 | 0.30 | 0.16 | 0.20 | 0.10 | 0.08 |
| | | | | | | |
| FILTER 2 | 0.0 | 0.6 | 0.0 | 0.0 | 0.6 | 0.0 |
| N | 3 | 3 | 4 | 5 | 3 | 4 |
| Xn=Z+FILTER 2*E(n−1) | 2.20 | 1.72 | 3.40 | 4.20 | 1.92 | 3.20 |
| En=abs(N−Xn) | 0.80 | 1.28 | 0.60 | 0.80 | 1.08 | 0.80 |
| | | | | | | |
| Min(Em,En) | 0.20 | 0.30 | 0.16 | 0.20 | 0.10 | 0.08 |
| Y | 2 | 2 | 3 | 4 | 2 | 3 |

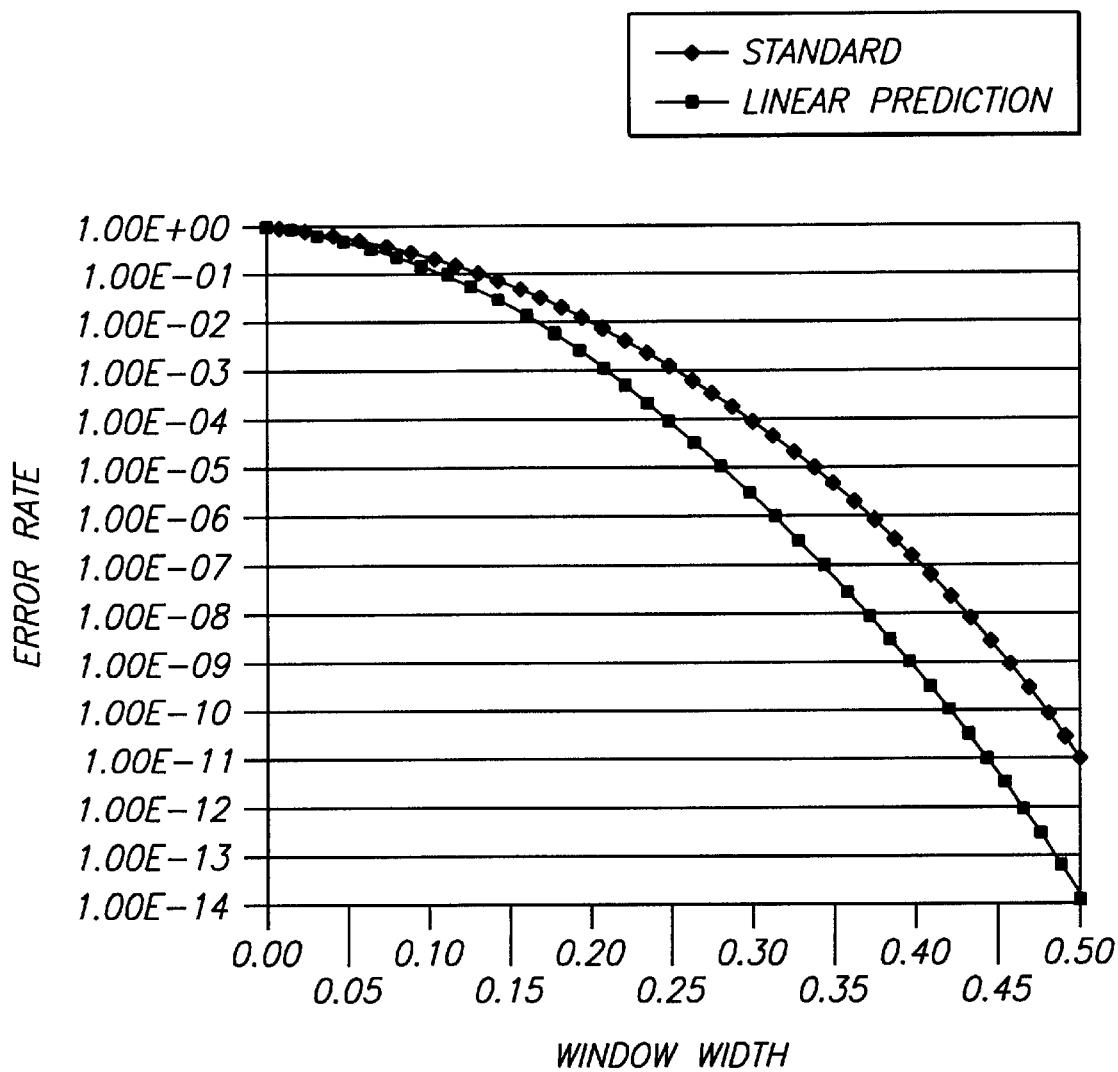

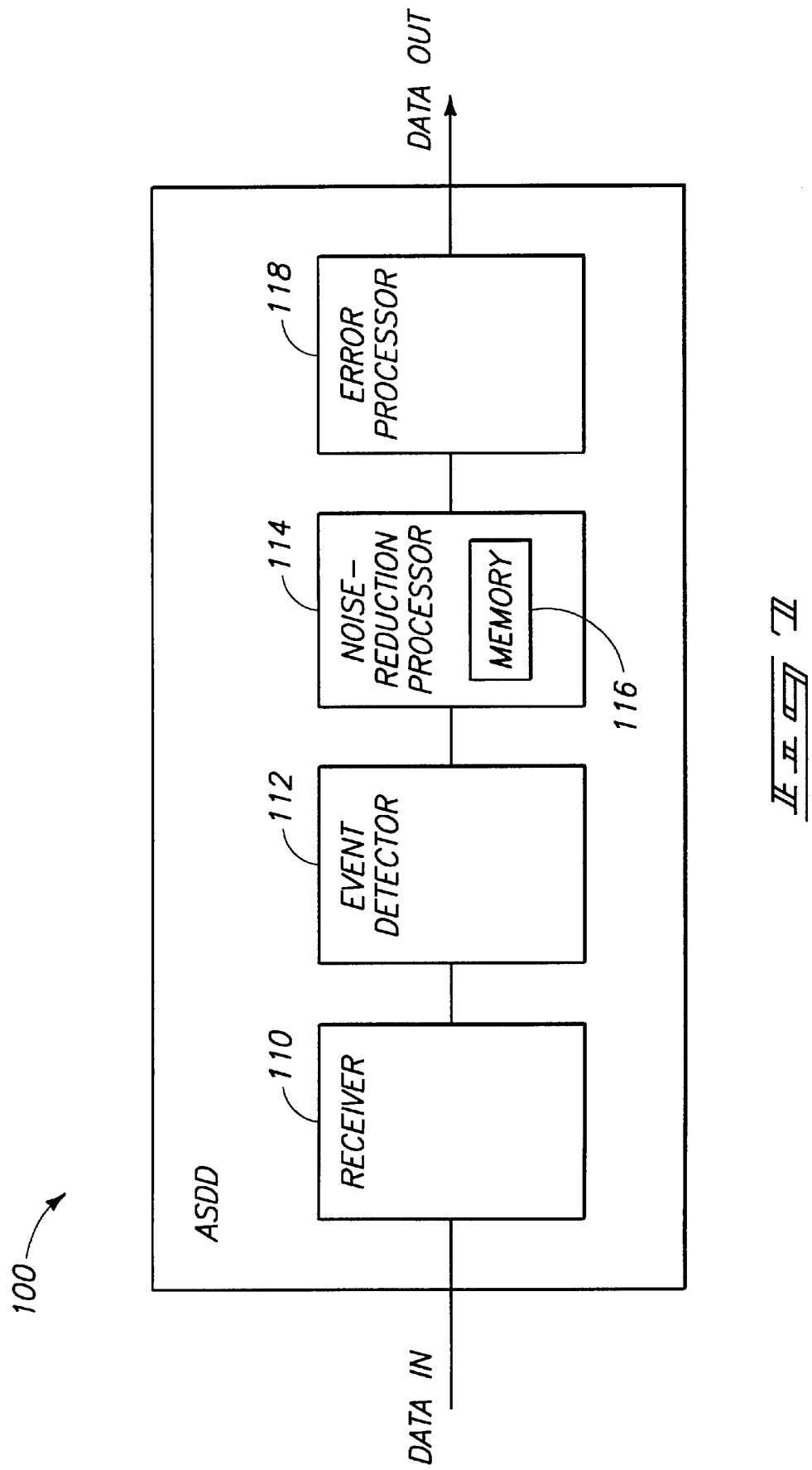

ASYNCHRONOUS SAMPLING DIGITAL DETECTION (ASDD) METHODS AND APPARATUS

FIELD OF THE INVENTION

The present invention relates to asynchronous sampling digital detection (ASDD) methods and apparatus.

BACKGROUND OF THE INVENTION

Auxiliary storage devices, such as ones used in connection with computers, are usually based upon moving memory devices such as rotating magnetic or optical disks and drums, or upon moving magnetic tape, which may be locally, physically altered in magnetic or optical properties to represent data. Locations for physically altered regions are aligned and spaced in tracks to ease location and read back of the data represented by the regions. Ideally, as a track is moved passed a read back transducer at a fixed speed, the locations are presented at regular intervals and the physically altered regions are appropriately aligned and spaced to allow generation of equally and evenly spaced electrical pulses for formatting as data.

The conditions of data storage and recovery are rarely ideal and, as a result, data recovery channels must be adapted to overcome difficulties in detecting encoded binary information. In retrieving data from a storage system, a read channel is typically utilized to convert the data into a digital format. In a magnetic tape system, data is sensed by a read head and transformed into an analog signal. The analog signal may be amplified and filtered. The signal is then sampled and converted into a digital signal by an analog-to-digital converter.

One type of system for data recovery employs peak detection to retrieve encoded binary information. In a peak-detection system, a peak detector is employed in a read channel to aid in detecting logical ones and zeros in the digital signal. Binary information is encoded within the digital signal. The peak detector recognizes logical ones and zeros by locating the peaks of a waveform. The peak detector interprets a peak as a logic one. The distance between peaks can be utilized to encode binary information such as representing zeros. Accordingly, accurate detection of the distance between peaks can be very important in accurately detecting the encoded information.

Noise, however, can affect the manner in which digital data is interpreted. Specifically, noise can muddle the detection process such that the distance between peaks is not detected in the form of an integer value (which can be most desirable), but rather as an integer plus some fractional component which is indicative of, or caused by noise which is present in the system.

One solution which has been proposed to address such noise-corrupted information has been to simply round the received integer and fractional component to the nearest integer. Thus, in systems where a noise component constitutes less than 0.5, the rounded integer would accurately describe the correct digital data. However, in systems where the noise component contributes 0.5 or more, the system would inaccurately round to a next higher integer, thereby inaccurately detecting the encoded binary information.

Asynchronous Sampling Digital Detection, or ASDD systems and methods can be used to retrieve data such as that described above. Various aspects of ASDD methods and apparatus are described in U.S. Pat. Nos. 5,293,369, 5,629,914, 5,461,642, 5,295,128, 5,442,315, 5,461,638, 5,315,284, 5,530,601, and 5,502,711, the disclosures of which are incorporated by reference herein.

This invention arose out of concerns associated with improving ASDD methods and apparatus.

SUMMARY OF THE INVENTION

Asynchronous Sampling Digital Detection (ASDD) methods and apparatus are described. In one embodiment, noise-corrupted information is received and comprises a plurality of information-carrying events which encode binary information which is desired to be retrieved. A plurality of values are extracted from the noise-corrupted information-carrying events which are representative of the encoded binary information. An amount of noise corruption carried by one of these plurality of values is estimated by considering an amount of noise corruption carried by another of the plurality of values. Responsive to the estimation of the noise corruption, the one value is then modified. In another embodiment, noise-corrupted information is received comprising a plurality of information-carrying events which encode binary information which is desired to be retrieved. A plurality of values from the noise-corrupted information-carrying events are determined which are representative of the encoded binary information. A set of conditions is defined which are a function of the plurality of values, and which have value-dependent outcomes. For a given determined value of the plurality of values, a value-dependent outcome is imposed to produce at least two intermediate noise-adjusted values. Using the two intermediate noise-adjusted values, a noise-reduced output value for the given determined value is selected.

DESCRIPTION OF THE DRAWINGS

FIG. 6 describes an error rate margin plot calculated in accordance with one or more embodiments of the present invention.

FIG. 7 is a block diagram of an exemplary ASDD in accordance with one or more embodiments of the present invention.

DETAILED DESCRIPTION OF THE INVENTION

Figure 1:
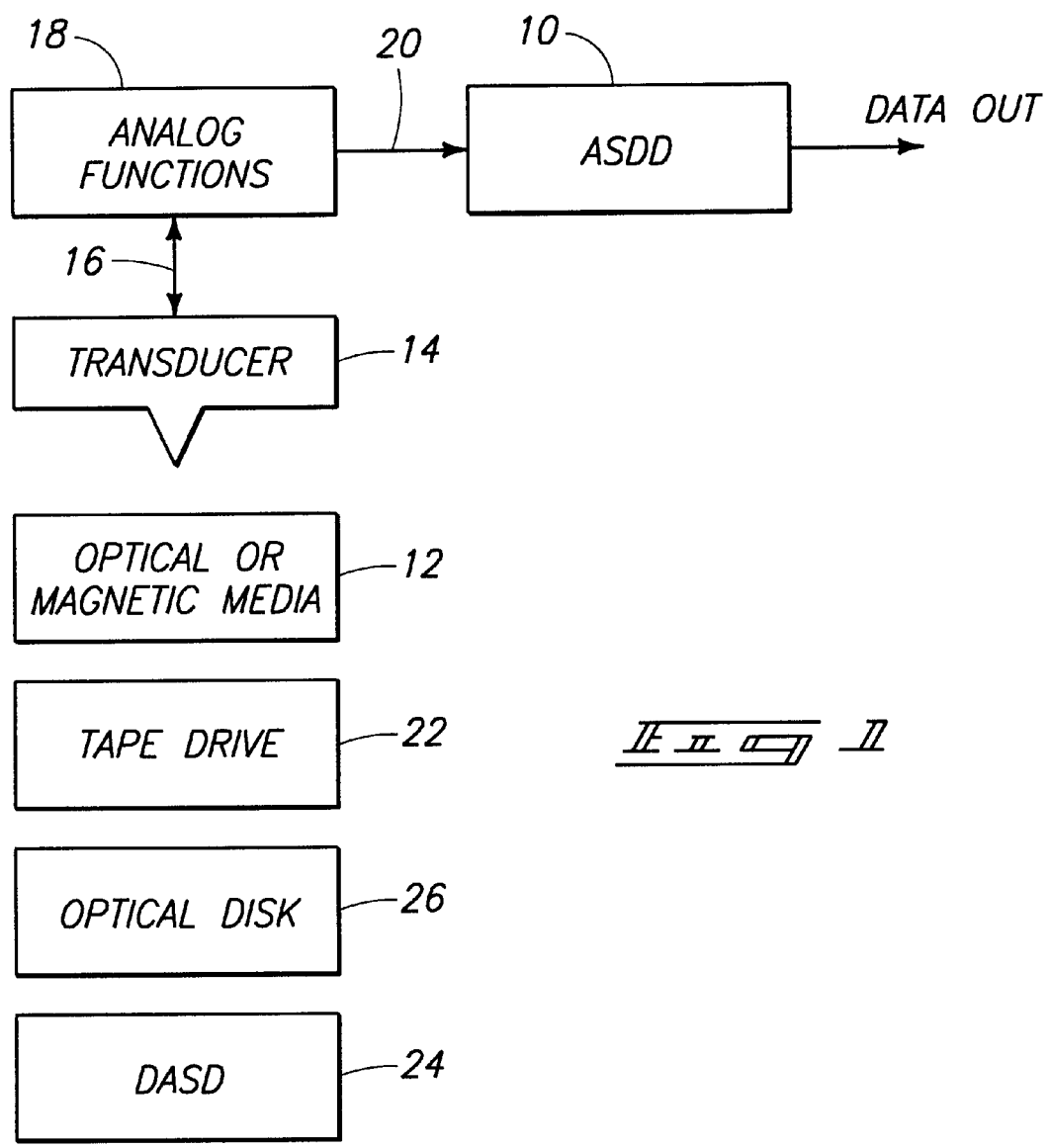
FIG. 1 provides a high level block diagram of an ASDD system in accordance with one or more embodiments of the present invention.

FIG. 1 illustrates the relationship between an Asynchronous Sampling Digital Detector (ASDD) 10 and an optical or magnetic data storage medium 12. The present invention is described in the context of an ASDD which employs a peak detection system to retrieve encoded binary information. Various aspects of the invention can, however, be utilized in the context of other detection systems, e.g. Pulse-Width-Modulation (PWM) systems.

Continuing, magnetic or optical threshold crossings in medium 12 are sensed by a transducer 14 in any useful manner known in the art. A transducer output signal 16 is presented to the usual plurality of analog functions 18. These functions can include preamplification, Automatic Gain Control (AGC), and anti-aliasing (low-pass) filtering. The resultant analog data signal waveform 20 is presented to ASDD 10 for data processing.

ASDD 10 can typically include an analog-to-digital (AD) converter, various digital filters such as finite impulse response (FIR) filters, sampling clock functions, and detectors for detecting information-carrying events. Information-carrying events can include threshold crossings or peaks in the received information as will become apparent below.

In situations where medium 12 consists of a magnetic tape in a tape drive 22 or the magnetic disk surface in a Direct Access Storage Device (DASD) 24, the recovered data appear as peaks or pulses in waveform 20. Detection of such peaks or pulses requires differentiation in the ASDD's detector. However, where medium 12 is an optical medium such as an optical disk drive 26, the signal may be Pulse-Width-Modulated (PWM) so that the recovered data are encoded as waveform transitions through a variable but predetermined threshold. For such applications, no signal differentiation is required in the ASDD's detector.

One method for recovering binary data from a received waveform is to count the clock periods between consecutive peaks or threshold-crossings (zero crossings) according to predetermined digital information. Such is described in more detail in U.S. Pat. No. 5,293,369, incorporated by reference above. The present invention has particular utility in connection with those systems and methods described in the references incorporated above.

The invention which is described just below, as such pertains to ASDD methods and apparatus, can offer improved error rate performance over that which has been obtainable in the past with conventional ASDD channels, such as those described in the incorporated references. In a preferred embodiment, the invention employs linear prediction techniques to account for and reduce noise corruption which is present in the information which is received by the ASDD. Various aspects of the invention recognize and take advantage of the fact that the noise which is present in received information can be correlated. Accordingly, the inventive methods and systems specifically address advantages that can be exploited when the noise process has specific types of correlation properties common in data storage subsystems.

Specifically, a key contributor to error rate in a magnetic recording channel is the additive Gaussian noise or signal-to-noise ratio. In many peak detection channels there are principally two error rate mechanisms. These two error rate mechanisms are amplitude error events and timing-based error events. Readback signal equalization and the head media response correlates the noise.

The present invention can take advantage of the noise correlation, thereby providing a higher signal-to-noise ratio and, ultimately, an improved error rate. In a most preferred embodiment, the invention utilizes a linear predictor to form a prediction of the error caused by additive noise based on past samples. The calculated predicted sample is correlated with the bit distance decision so that the predicted error, which is correlated to the distance between bits, can be subtracted from the current bit decision.

Additive noise in this channel can be broken down into two components—noise that has minimal correlation or white additive Gaussian noise, and an additive noise component that is colored or correlated. The present invention can improve error rate by using a modified form of linear prediction to minimize the correlated noise component of the total noise power normally present. Computer modeling of the present invention has demonstrated, as will become apparent below, an improvement in the signal-to-noise ratio between 1.0 and 2.0 dB depending on the read-back signal evaluated.

Figure 2:
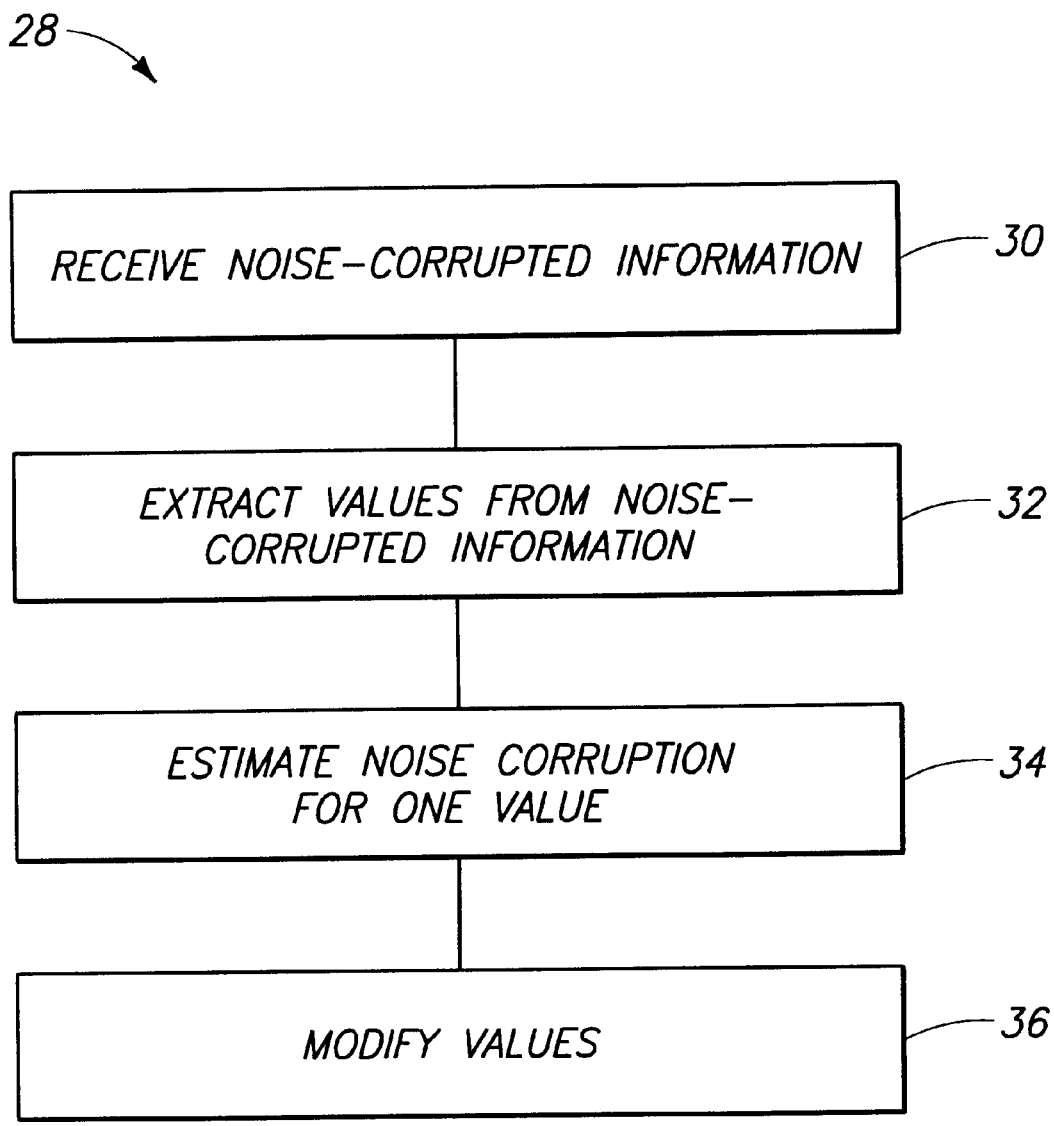
FIG. 2 provides a flow diagram which describes one embodiment of the present invention.

Referring to FIG. 2, a flow chart 28 is shown and describes various methodical steps in accordance with one embodiment of the invention. Such steps can be implemented in any suitable hardware, software, or firmware. Embodiments of such hardware, software, and/or firmware preferably reside in an ASDD such as that which is shown in FIG. 1.

Noise-corrupted information is received at 30, and comprises a plurality of information-carrying events which encode binary information which is desired to be retrieved. In a preferred embodiment, the information-carrying events comprise a series of digitized waveform peaks which encode the binary information. Preferably, the binary information is encoded by the distance between the digitized waveform peaks. A plurality of values are extracted, at 32, from the noise-corrupted information-carrying events. These values are representative of the encoded binary information. In a preferred embodiment, and in the context of a peak detection system, the plurality of values comprise the distance between the digitized waveform peaks. These values are, ideally, integer values. However, because of noise which is present in the system, as described above, these values are typically in the form of an integer value plus a fractional noise component. For example, the chart set forth in FIG. 5 has, in its uppermost row, six values which are designated as Z. These Z values, 2.2, 1.6, 3.4, 4.2, 1.8, and 3.2, constitute exemplary values containing a fractional noise component. For purposes of the ongoing discussion, such individual values are referred to as Z, $Z_{in}$, or Z(n).

At 34 (FIG. 2) an amount of noise corruption carried by one of the plurality of Z values is estimated by considering an amount of noise corruption carried by another of the plurality of Z values. In a preferred embodiment, the noise corruption is estimated by using or considering an amount of noise corruption carried by a past Z value. Specifically, by recognizing that the noise can be correlated as between the various inputs, measures can be taken to remove noise from one input based on past history or the historical noise environment surrounding other samples. Once the noise for a particular given value of $Z_{in}$ has been estimated through the various correlation methodologies provided by the present invention, the $Z_{in}$ value can be modified to a noise-reduced value responsive to the noise estimation carried by the other considered Z value. Exemplary modified $Z_{in}$ values are set forth in the chart of FIG. 5, in the bottommost row designated as Y.

In one embodiment, estimation of the noise corruption comprises applying a filter to an amount of noise corruption carried by a past value which, in turn, defines a filtered past noise corruption value. The filtered past noise corruption value is then combined with the present value to assist in noise estimation for the present value. Such will become more apparent below as the description of the values contained in the FIG. 5 chart and how those values were calculated is set forth.

Figure 3:
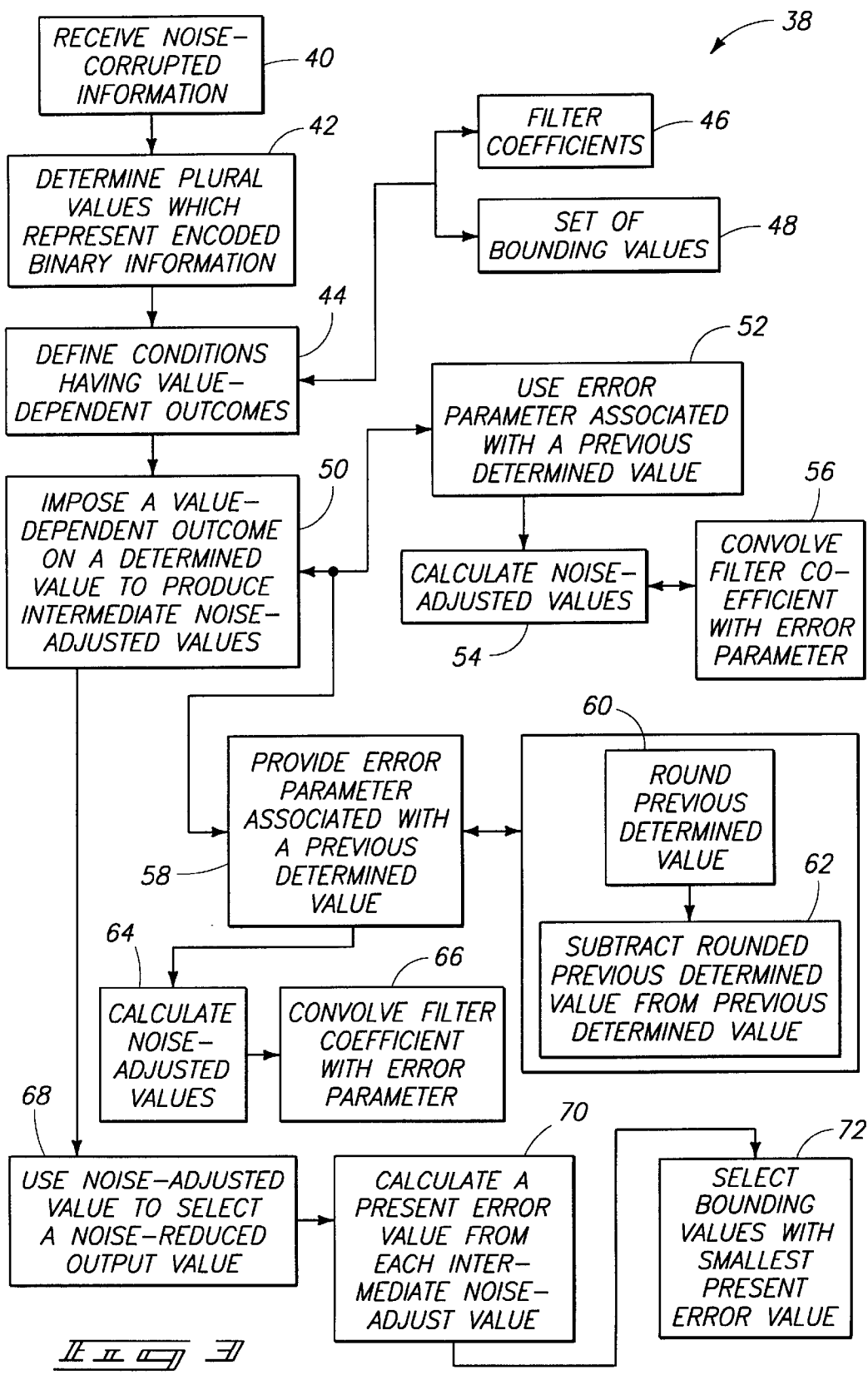
FIG. 3 provides a flow diagram which describes one or more embodiments of the present invention.

Referring to FIG. 3, a flow chart is shown generally at 38 and describes various embodiments of the present invention. The methodologies described in FIG. 3 can be implemented in any suitable hardware, software, or firmware.

At 40, noise-corrupted information is received and comprises a plurality of information-carrying events which encode binary information which is desired to be retrieved. At 42, a plurality of values (Z) are determined from the noise-corrupted information-carrying events. These values are representative of the encoded binary information. In a peak detection system, such values can comprise the distance between peaks as described above. At 44, a set of conditions are defined which are a function of the plurality of Z values, and which have value-dependent outcomes. For example, set forth below is an exemplary set of conditions which have been defined in accordance with one embodiment of the invention, and which are functions of the plurality of Z values:

If Z(n)<3
    Filter1=$LP_2$
    Filter2=$LP_3$
    M=2
    N=3
If Z(n)<4
    Filter1=$LP_3$
    Filter2=$LP_4$
    M=3
    N=4
If Z(n)<5
    Filter1=$LP_4$
    Filter2=$LP_5$
    M=4
    N=5
If Z(n)<6
    Filter1=$LP_5$
    Filter2=$LP_6$
    M=5
    N=6
If Z(n)<7
    Filter1=$LP_6$
    Filter2=$LP_7$
    M=6
    N=7
If Z(n)<8
    Filter1=$LP_7$
    Filter2=$LP_8$
    M=7
    N=8
END The conditions determine whether Z(n) is less than a particular value, where Z(n) is equal to the number of bit periods between adjacent transitions which are corrupted by noise. In this example, the conditions have value-dependent outcomes which comprise both filter coefficients, and bounding values. Depending on the Z value which meets the particular defined condition, a number of value-dependent outcomes are possible.

For example, if Z(n) is less than three, then Filter 1 is equal to $LP_2$ and Filter 2 is equal to $LP_3$, where $LP_j$ is equal to the linear prediction filter coefficient for transitions which are separated by spacing j. Accordingly, in this example, each value-dependent outcome comprises two filter coefficients. Such is shown at 46. In a preferred embodiment, the value dependent outcomes also comprise a set of bounding values 48 which bound individual given determined Z values. In this example, bounding values are provided by M and N, where M and N represent the nearest transition spacing for a given value of Z(n). Accordingly, if Z(n) is less than 3, then bounding values 2 and 3 are selected. If Z(n) is less than 4, then bounding values 3 and 4 are selected, and so on. Other exemplary bounding values are given in the FIG. 5 chart for selected Z values. At 50, and for a given determined value of Z(n), the value-dependent outcomes are imposed on the determined Z(n) to produce at least two intermediate noise-adjusted values. For example, set forth below are two intermediate noise-adjusted values which have been produced through the imposition of the value-dependent outcomes on a given value of Z(n). Such are represented by $X_m$ and $X_n$ and are set forth in the FIG. 5 chart.

$X_m=Z(n)+E(n-1)*$Filter 1

$X_n=Z(n)+E(n-1)*$Filter 2

Here, the two intermediate noise-adjusted values $X_m$ and $X_n$ constitute input data samples with correlated noise removed. The term E(n−1) constitutes an error parameter which is associated with a previous determined value or, put another way, is the error remaining from a previous bit decision. Such error parameter is used, at 52, to calculate at 54, the noise-adjusted values. In a preferred embodiment, the noise-adjusted values are provided by a convolution process at 56, in which a filter coefficient is convolved with a particular error parameter which is associated with a previous determined Z value. Preferably, the convolution process takes place for each associated bounding value M and N. Accordingly, in the illustrated example, each bounding value M and N has a noise-adjusted value $X_m$ and $X_n$ associated with it. Each noise-adjusted value $X_m$ and $X_n$ is the sum of the current Z(n) and the respective convolution products of a selected filter and the error remaining from the previous bit decision. Such is shown in the FIG. 5 chart.

Figures 4, 5:
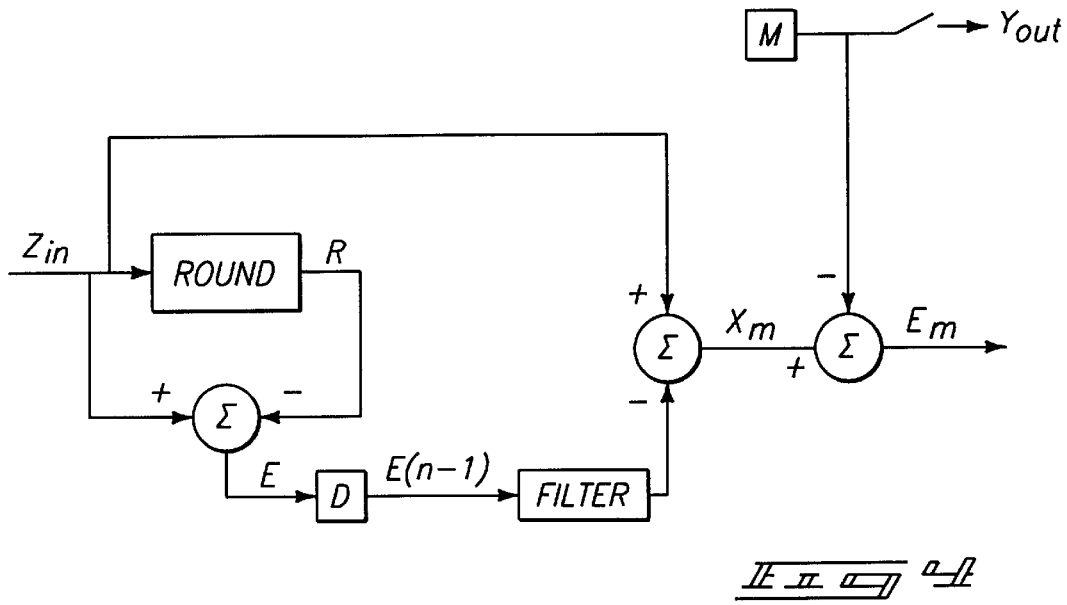
FIG. 4 provides an illustrative embodiment of one or more aspects of the present invention.
FIG. 5 is a chart containing exemplary values, some of which are arrived at through various embodiments of the invention.

In another embodiment, imposition of a value-dependent outcome on a determined Z value to produce the intermediate noise-adjusted values comprises providing an error parameter at 58 which is associated with a previous determined Z value. Such error parameter can be provided by remembering the error remaining from the previous bit decision. In one embodiment, the error parameter can be provided by rounding the previous determined value at 60 to the nearest integer to provide a rounded previous determined value R (FIG. 5). At 62 the rounded previous determined value R is subtracted from the previous determined value Z to provide an error parameter E (FIG. 5). From such provided error parameters, noise-adjusted values can be calculated, at 64, as described above in connection with values $X_m$ and $X_n$. In a preferred embodiment, the noise-adjusted values are calculated by convolving, at 66, the filter coefficient with the error parameter for each bounding value M and N, and then adding the convolution product to the current Z(n). At 68, and using the two intermediate noise-adjusted values $X_m$ and $X_n$, a noise-reduced output value is selected for a given determined value Z(n). In a preferred embodiment, selection of the noise-reduced output value comprises, at 70, calculating a present error value from each intermediate noise-adjusted value $X_m$ and $X_n$. For example, the present error values (FIG. 5) can be calculated as follows:

ErrorM=abs(M−$X_m$)

ErrorN=abs(N−$X_n$)

Here, the present error value for each bounding value is defined to be the absolute error as given by the formulas above. Having calculated the present error value, a bounding value, either M or N, can be selected at 72 which has the smallest present error value. Such can be implemented as described immediately below:

```
If ErrorM<ErrorN
    Y(n)=M
Else
    Y(n)=N
END
```
Here, Y(n) constitutes output data. The process just described is illustrated for a bounding value M in schematic form in FIG. 4.

Referring to FIG. 6, an error rate margin plot is shown and illustrates the performance gain realized using the present invention as opposed to standard methods described above, and in the patents which are incorporated by reference. The "standard" graph was generated using Z(n) and rounding the value to the nearest integer. The linear prediction curve shows how the overall detection rate is improved through the various methods of the present invention.

Referring to FIG. 7, an Asynchronous Sampling Digital Detector in accordance with one or more embodiments of the invention is shown generally at 100 and comprises a receiver 110 which is configured to receive noise-corrupted information comprising a plurality of information-carrying events which encode binary information as described above. An event detector 112 is provided and is operably coupled with receiver 110. The event detector is preferably configured to determine from the noise-corrupted information a plurality of values, such as the Z values described above, which are representative of the encoded binary information. A noise-reduction processor 114 is provided and is operably coupled with event detector 112 and is configured to estimate an amount of noise corruption carried by one of the plurality of Z values by considering an amount of noise corruption carried by another of the plurality of Z values. Noise-reduction processor 114 is preferably configured to modify the one Z value responsive to estimating the amount of noise corruption it carries. In a preferred embodiment, event detector 112 comprises a peak detector.

In one embodiment, noise-reduction processor 114 comprises memory 116 which contains a plurality of filters or filter coefficients, e.g. Filter 1 and Filter 2, and a plurality of bounding values, e.g. M and N. Noise-reduction processor 114 preferably assigns each of the Z values determined by event detector 112 a pair of filters or filter coefficients, and a pair of bounding values M and N. Noise-reduction processor 114 is preferably further configured to calculate, for each bounding value M and N, an intermediate noise-adjusted value which comprises a convolution product of one of the filters and an error parameter, e.g. E(n−1), which is associated with a past Z value determined by event detector 112. Exemplary noise-adjusted values are given above as $X_m$ and $X_n$.

In a preferred embodiment, an error processor 118 is provided and is operably coupled with noise-reduction processor 114. Error processor 118 is preferably configured to calculate a present error value, e.g. $E_m$ and $E_n$, for each bounding value M and N, for each Z value which is determined by event detector 112. Responsive to the present error value calculation, error processor 118 is preferably configured to select a bounding value having the smallest present error value. In one embodiment, error processor 118 is configured to calculate the absolute error between a bounding value and its associated intermediate noise-adjusted value, e.g. $Em=abs(M-X_m)$.

The above-described ASDD 100 can be implemented in any suitable hardware, software, or firmware.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An Asynchronous Sampling Digital Detection (ASDD) method comprising:
    receiving noise-corrupted information comprising a plurality of information-carrying events which encode binary information which is desired to be retrieved;
    extracting from said noise-corrupted information-carrying events a plurality of values which are representative of the encoded binary information;
    estimating an amount of noise corruption carried by one of said plurality of values by considering an amount of noise corruption carried by another of said plurality of values; and
    modifying said one value responsive to said estimating of the amount of noise corruption carried by said one value.

2. The ASDD method of claim 1, wherein said plurality of information-carrying events comprise a series of digitized waveform peaks.

3. The ASDD method of claim 1, wherein said plurality of information-carrying events comprise a series of digitized waveform peaks, and said binary information is encoded by the distance between said digitized waveform peaks.

4. The ASDD method of claim 1, wherein said estimating of said amount of noise corruption comprises using an amount of noise corruption carried by a past value.

5. The ASDD method of claim 1, wherein said estimating of said amount of noise corruption comprises using an amount of noise corruption carried by a past value, said using comprising applying a filter to said amount of noise corruption carried by said past value to define a filtered past noise corruption value, and combining said filtered past noise corruption value with said one value.

6. An Asynchronous Sampling Digital Detection (ASDD) method comprising:
    receiving noise-corrupted-information comprising a plurality of information-carrying events which encode binary information which is desired to be retrieved;
    determining a plurality of values from said noise-corrupted information carrying events which are representative of the encoded binary information;
    defining a set of conditions which are a function of said plurality of values and which have value-dependent outcomes;
    for a given determined value, imposing a value-dependent outcome on said determined value to produce at least two intermediate noise-adjusted values; and
    using said two intermediate noise-adjusted values, selecting a noise-reduced output value for said given determined value.

7. The ASDD method of claim 6, wherein one of said value-dependent outcomes comprises at least one filter coefficient.

8. The ASDD method of claim 6, wherein one of said value-dependent outcomes comprises a set of bounding values which bound individual given determined values.

9. The ASDD method of claim 6, wherein:
    one of said value-dependent outcomes comprises at least one filter coefficient; and another of said value-dependent outcomes comprises a set of bounding values which bound given individual determined values.

10. The ASDD method of claim 6, wherein said imposing of said value-dependent outcome comprises using an error parameter associated with a previous determined value and calculating said at least two intermediate noise-adjusted values using said error parameter.

11. The ASDD method of claim 6, wherein:

one of said value-dependent outcome comprises at least one filter coefficient;

another of said value-dependent outcomes comprises a set of bounding values which bound given individual determined values; and said imposing of said value-dependent outcome comprises, for each bounding value, providing an error parameter associated with a previous determined value and with said error parameter calculating said at least two intermediate noise-adjusted values.

12. The ASDD method of claim 11, wherein said calculating comprises convolving a filter coefficient with said error parameter associated with said previous determined value.

13. The ASDD method of claim 12, wherein said using of said two intermediate noise-adjusted values comprises calculating a present error value from each of said two intermediate noise-adjusted values, and said selecting comprises selecting for said noise-reduced output value, the bounding value having the smallest present error value.

14. The ASDD method of claim 13, wherein the providing of the error parameter comprises:

rounding said previous determined value to the nearest integer to provide a rounded previous determined value; and subtracting the rounded previous determined value from the previous determined value to provide the error parameter.

15. An Asynchronous Sampling Digital Detector (ASDD) comprising:

a receiver configured to receive noise-corrupted information comprising a plurality of information-carrying events which encode binary information;

an event detector operably coupled with the receiver and configured to determine from the noise-corrupted information a plurality of values which are representative of the encoded binary information; and a noise-reduction processor operably coupled with the event detector and configured to estimate an amount of noise corruption carried by one of the plurality of values by considering an amount of noise corruption carried by another of the plurality of values, the noise-reduction processor further being configured to modify the one value responsive to estimating the amount of noise corruption carried by said one value.

16. The ASDD of claim 15, wherein the event detector comprises a peak detector.

17. The ASDD of claim 15, wherein the noise-reduction processor comprises memory containing plurality of filters and a plurality of bounding values, each of the values determined by the event detector being assigned by the noise-reduction processor a pair of filters and a pair of bounding values, the noise-reduction processor being further configured to calculate for each bounding value an intermediate noise-adjusted value comprising a convolution product of one of the filters and an error parameter which is associated with a past value determined by the event detector.

18. The ASDD of claim 17 further comprising an error processor operably coupled with the noise-reduction processor and configured to calculate a present error value for each bounding value for each value determined by the event detector, and responsive thereto, select a bounding value having the smallest present error value.

19. The ASDD of claim 18, wherein the error processor is configured to calculate the absolute error between a bounding value and an associated intermediate noise-adjusted value.

20. The ASDD of claim 15, wherein the event detector comprises a peak detector, and wherein the noise-reduction processor comprises memory containing a plurality of filters and a plurality of bounding values, each of the values determined by the event detector being assigned by the noise-reduction processor a pair of filters and a pair of bounding values, the noise-reduction processor being further configured to calculate for each bounding value an intermediate noise-adjusted value comprising a convolution product of one of the filters and an error parameter which is associated with a past value determined by the event detector.

* * * * *